Patented July 2, 1946

2,403,144

UNITED STATES PATENT OFFICE 2,403,144

COMPOSITION FOR EFFECTING AGGLOMERATION OF SOLIDS IN AQUEOUS SUSPENSIONS

Richard Tutt, Jr., John R. Hubbard, and Charles R. McKee, Gowanda, N. Y., assignors to Peter Cooper Corporations, Gowanda, N. Y.

No Drawing. Application November 21, 1944, Serial No. 564,558

6 Claims. (Cl. 252—181)

This invention relates to compositions for effecting initial agglomeration of suspended particles in aqueous mediums, preliminary to removal of the agglomerated particles from the aqueous mediums.

By agglomeration we mean the holding together, flocculation, precipitation, coagulation and that general condition wherein the originally suspended particles coalesce or heap together in such a manner that the original stability of the suspension is ruptured, and the easy removal of the suspended solids by settling, flotation or filtering is possible.

In the removal of suspended solids from raw waters, process waters, and industrial wastes, it is customary to add auxiliary chemicals to such waters to promote therein the formation of a gelatinous auxiliary floc or agglomerate resulting primarily in a physical entanglement of the suspended solids within the floc and then removing the floc or agglomerate by the subsequent settling, filtering or flotation by equipment and processes well known in the trade. The efficiency of such recovery systems is largely dependent on the speed of flocculation and the degree of complete flocculation and removal of the suspended particles.

Another, but not as well known method for inducing agglomeration of solids suspended in mordanted aqueous mediums lies in the introduction of a protein colloid, such as animal glue or casein to the suspension. The mordant is generally a trivalent aluminum ion as in the use of alum or aluminum sulfate. Under such a system if the type of solid suspension, degree of mordanting, proportion of protein colloid, and pH of the system are properly balanced, an agglomeration and/or flocculation of the suspended solids can frequently be effected. This type reaction is generally understood to be effected by the neutralization of the like electrical charges present upon the mordanted particles of the suspension by the colloid, so that the neutralizing of the like charges by the colloid disrupts the electrical stability of the suspension, thereby promoting agglomeration of the particles.

One object of the present invention is to provide an improved auxiliary agglomerator which is more rapid in action, more versatile under widely different operating conditions, and more effective in complete agglomeration of even the finest suspended solids than is possible with the usual aluminum or iron hydroxide chemical flocs previously used.

Another object of the present invention is to provide an improved animal glue colloid composition of matter which is far more efficient in agglomerating action; more versatile under wide fluctuations in type of suspended solid, pH and degree of mordanting of the system; and which effects a more complete agglomeration of those systems of solid suspensions which heretofore have been difficult or impossible to agglomerate with animal protein compositions previously used.

Other objects and advantages of this invention will appear from the following description and claims.

In accordance with our invention, we add to a dilute animal glue colloid solution of approximately 1% concentration, a reactive chromic salt in an amount equal to about 5% to 20% based on the weight of the dry glue. This reactive chromic salt may be potassium chrome alum (potassium chromic sulfate), but it is possible to use other chromic compounds in place of the chrome alum, such for example as chromic sulfate, chromic nitrate, chromic acetate, or chromic chloride, namely, any other chromium compound which when added to 1% animal glue solution will liberate reactive trivalent chromic ions, and will promote the formation of a purple colored cast or phase in the completed agglomerating agent on aging from four to six hours. It has been found that this development of a purple cast as differing from the original green cast, serves as an indicator of the reactivity of the agglomerator. When this purple phase is clearly evident, the agglomerator is in its reactive form and is ready for use. It is believed the purple phase connotes a colloidal or basic condition of the animal glue-chrome composition desirable for imparting the optimum reactive properties to the agglomerator. The use of certain basic chromic sulfates and/or chromic acetate, while providing trivalent chromic ions, retards the formation of the purple cast when added to the 1% glue solution. Such chromic addition agents, while of value, are less desirable for the purposes of this invention. It is preferable, but not essential, to add to the solution from 3% to 12% (dry basis) of a mildly alkaline colloid, such as rosin sizes, rosin soaps, sodium resinates, and/or the usual soaps of commerce, the percentage of these alkaline colloids being based on the dry weight of the glue in the solution.

The following preparations have also been found very effective to improve and expedite the agglomeration of solids in aqueous solutions:

(a) 100 pounds glue, 10 to 20 pounds potassium chrome alum and 1200 gallons of water.
(b) 100 pounds glue, 5 to 10 pounds chromic sulfate, and 1200 gallons of water.
(c) 100 pounds glue, 6 to 12 pounds chromic nitrate, and 1200 gallons of water.
(d) 100 pounds glue, 5 to 10 pounds chromic chloride, and 1200 gallons of water.
(e) 84 pounds glue, 5 to 9 pounds rosin size (dry basis), 13 pounds chrome alum, 1 gallon formaldehyde, and 1000 gallons of water.

This latter formula (e) is particularly effective for use in paper mills, either for the retention of fibers, fillers, sizing, and/or color in the forming sheet as it passes over the wire on the paper machine, or in the cylinder vats; or for treating the effluent water (white water) from these machines for the recovery of such fibers and fillers therefrom or both.

To compositions a, b, c, and d may be added 3 to 12 pounds dry basis of rosin size, sodium resinate, rosin soap, or other mildly alkaline soap.

This preparation may be used for any purpose in which agglomeration of finely divided or suspended particles of matter is desired. It has been found particularly effective to use this composition in paper pulp suspensions while passing to the Fourdrinier wire or cylinder screen of a paper machine for the purpose of holding within the paper suspended particles which would otherwise be carried away in the escaping water. The composition is equally effective when used for many other purposes, and it has been found that this improved auxiliary agglomerating solution is more efficient and greatly superior to any solutions heretofore disclosed or used in the trade, possessing a wider working range under nearly all conditions of degree of mordanting, type of fiber, filler or solids in those suspensions which are of commercial interest. The agglomerating solution may be used to good advantage for reclaiming paper pulp and fillers from white water and permits a reduction of from 25% to 50% in the amount of auxiliary agglomerating agent required, as compared with compositions previously disclosed or used for this purpose, both when used in connection with reclaiming substances from white water and when used in paper pulp suspensions passing to paper making machines.

The new agglomerating composition permits effective agglomeration of paper pulps loaded with calcium carbonate fillers, both at the paper machine and in the recovery of material from the white water, which heretofore has been either impossible or highly inefficient when using agglomerating solutions of the prior art.

Our improved agglomerating composition permits sharper and faster agglomeration of all types of fiber and fiber-filler paper pulp suspensions than heretofore possible, and the effluent from recovery apparatus is crystal clear when our improved composition has been used, under a wider range of operating conditions than heretofore possible, thus eliminating to a greater degree the possibility of stream pollution and permitting increased recovery of valuable paper fibers and fillers.

Our improved agglomerating composition is effective as an agglomerator in suspensions of wide pH range (3.8–7.6), whereas the previously known agglomerators were limited to use in well mordanted systems in the range of 4.2 to 5.5, decreasing in effectiveness above 5.5 sharply as approaching pH 7.0. The new composition, therefore, permits agglomeration in the more neutral pH range than heretofore possible, which is important to those paper mills running more or less neutral pH paper furnishes.

Our new agglomerating composition is effective within three to four hours after preparation, whereas previously known agglomerating solutions required an aging or ripening period of eighteen to twenty-four hours for reactive use. Our improved composition, therefore, provides for more efficient use of preparation tanks and equipment, permits greater operating latitude as to make-up and use, and consequent lower costs for initial installations as compared with the use of agglomerating agents of the prior art.

Our new composition can be prepared and aged with water of wide temperature variations, even with warm water as high as 125° F., whereas prior art animal glue agglomerating solutions required aging temperatures of 65° F. or lower to properly ripen the composition for effective reactive properties. The wide temperature latitude in the preparation and aging of the new composition is particularly useful to those paper mills and allied industries where, in the summer months, the surface waters used as a source of water bear temperatures as high as 80° to 85° F. or where the prepared agglomerating solutions are stored in tanks subject to the direct rays of the sun, or where the storage tanks are located near the ceilings in extremely warm plants.

Our new agglomerating composition possesses a wide reactive pH range in formulation. Commercial trials have been made in paper mills where the final pH of the agglomerating solutions have varied from 3.9 to 5.3, depending on the acidity of the animal glue used, pH of the water used, and the free acid content of the specific chromic salt added. The previous animal glue agglomerating solutions required correcting the pH to 4.7 for effective reactive use, and a variation of 0.1 to 0.2 pH points one way or the other from pH 4.7 rendered the previously known animal glue agglomerators markedly less effective in reactive properties. This far wider reactive pH range of our improved composition permits more uniformly reactive results under the usual variable operating conditions in the preparation of the agglomerator, permitting our composition in all cases to be prepared by less technically trained men than is required in the preparation of the previously known animal glue agglomerating solutions.

While a rosin size is the preferred mildly alkaline colloid to be used as a component part of our improved agglomerator, the use of cold process or boiled type soaps is possible. The function of such materials is not too well understood, but it is thought that they impart a slight additive agglomerating effect to the chromic salt-animal glue principle agglomerator, and aid in effecting more complete coalescing of the agglomerated particles through bonding together or matting of the flocced particles, thereby permitting easier and more efficient flotation or settling as desired. This is particularly true where our improved animal glue agglomerator is used in white water reclaiming apparatus and similar type installations, or where the suspensions fed to such equipment have been previously treated with our new agglomerator, as for instance at the wet end of the paper making machine for increased retention of fiber and filler on the wire or cylinder. The use of a colloidal soap is not necessary for effective agglomerating action, since there are many cases where the colloidal soaps can be eliminated satisfactorily. The combination of the colloidal soap with our chromic salt-animal glue composition provides, however, a more nearly perfect agglomeration of high efficiency and wide versatility. We have found that the use of from 3% to 12% of the colloidal soaps, dry basis, based on the dry weight of the animal glue provides a working range permitting variation in the physical characteristics of the agglomerated particles. For instance, if a rapidly settling floc is desired, the ratio of colloidal soap to dry glue is carried in the range of 10% to 12%, while for ease of flotation of the agglomerated particles, the ratio is maintained in the range of 3% to 8%.

The following procedure may be employed for preparing 1000 gallons of improved agglomerating compositions, but it will be understood that it is not intended to limit this invention to this procedure:

(1) 85 pounds of a good grade of animal glue are soaked in from 85 to 100 gallons of clean cold water in jacketed kettle until soft, which usually requires about one to two hours. The glue is melted at 140° F. and then run into a 1000 gallon tank and thoroughly mixed with about 750 gallons of water, the temperature of which may be from 50° to 125° F., but preferably between 50° to 70° F.

(2) A 5% to 7% solids solution of rosin size or a mildly alkaline soap is added and mixed with the glue solution now in the tank, amounting to from 3% to 12% of solids dry basis, based on the dry weight of the glue. If the user prefers to eliminate the rosin size or soap, this step is omitted.

(3) The chrome alum or equivalent chrome salt is dissolved in cold water in a separate mixing vessel (a 5% to 10% solution is advisable), using from 12 to 17 pounds of chrome alum or chemical equivalent thereof.

(4) The glue solution in the storage tank is diluted to approximately 900 gallons with cool water, and the chrome solution then added with mixing.

(5) If desired, 3 quarts of formalin may then be added for preservative purposes and the solution made up to 1000 gallons with cool water and mixing thoroughly. The completed solution is then aged in a dormant condition for four to six hours until a definite purple phase is evident. The solution is then ready for use.

In the use of our improved agglomerating composition, the following examples will indicate a few of the many commercial applications and methods, which may, however, be varied as will be evident to those skilled in the art, and these examples are, consequently, not to be construed as limiting the scope of this invention.

*Example I*

In the formation of paper in the Fourdrinier paper making machine, a dilute suspension of paper fibers and fillers adequately sized with rosin and/or starches or animal glue is fed to the machine chest in proper condition for the ultimate production of the desired quality and type of paper. For effecting an agglomeration of the fibers and fillers for the maximum retention of the finer, more highly sized fibers and valuable fillers within the sheet during the felting action upon the forming wires, for the purpose of producing a stronger more even formation of the sheet with even and desired opacity of the sheet effected by the fillers, a small stream of the improved agglomerating glue solution is fed to the dilute paper furnish just previous to its flow upon the wire. The point of addition of the agglomerating solution to the paper pulp suspension may be varied between the head box, riffler screens, and entrance to the sluice, depending on the speed of the machine, the type of fiber and filler employed and upon other conditions, the addition of the agglomerator being effected at that point determined by trial where the agglomerating action takes effect just as the treated furnish flows upon the wire. The agglomerating solution is added through the medium of a constant flow proportioner fed by a pipe line from the storage tank of the agglomerating solution, and flows from the proportioner to the point of addition to the pulp suspension by a small pipe line or lines. The amount of auxiliary agglomerating solution required is a function of the total solids in the pulp suspension and is determined by trial; in general in a range of 1 gallon of our agglomerating solution per 1000 gallons of pulp suspension. The agglomeration effected upon the pulp suspension conserves to a marked degree the retention of the fibers and fillers upon the wire, reduces loss of fine fibers and fillers in the white waters, promotes even formation, promotes maintenance of a high ash content and balance of filler to fiber in the sheet, and increased speed of drainage water from the pulp on wire. Similar procedures and resultant advantages are obtained in using the cylinder type paper making machine. Our improved composition permits a reduction of from 25% to 50% in the amount of agglomerator previously required, and induces an improved agglomeration of carbonate filled type pulps, as well as on those more common, more easily agglomerated pulp furnishes in a far wider range of degree of mordanting and pH than heretofore possible.

*Example II*

In the recovery of valuable pulp fibers and fillers present in the white waters fed to the usual recovery equipment, the addition of small amounts of the improved agglomerating solution promotes a sharp agglomeration of the suspended particles, permitting more efficient recovery of the suspended solids than heretofore possible. Approximately 1 gallon of our improved agglomerator is added to 1000 gallons of white water. When the white water passes to a continuous flow separator, our agglomerator may be added at the entrance to the same by means of a pipe line or regulator box and the agglomerator quickly forms a coarse floc of suspended particles, which can either be floated to the surface rapidly as a blanket, or rapidly settled, depending upon the type of recovery apparatus employed, thus effecting economy by reducing the time required for the treatment of the white water.

*Example III*

The use of our improved agglomerting solution is also applicable in the treatment of process waters, such as the removal of muds in the washing of sands, permitting re-use of the clarified water. In this case, our composition of matter is added to the muddy process water just before passing to large settling tanks of the type generally used in the trade. The agglomerating action takes place at once, permitting the muds to settle rapidly. The clarified overflow effluent is then suitable for re-use in the continued washing of the sand.

In addition to the above examples, our agglomerating solutions have many other uses, such for example as the separation of solids from coal mine wastes, distillery wastes, sewage, tannery wastes, raw waters, process waters, and industrial wastes where the recovery of suspended solids or clarification of turbid waters for re-use is desired, or where prevention of stream pollution is an important factor.

We claim as our invention:

1. An agglomerating composition comprising approximately a 1% animal glue solution in water, from 5% to 20% based on the weight of dry glue of a chromic salt, and from 3% to 12% dry basis of a mildly alkaline water soluble soap, each based respectively on the dry weight of the glue.

2. An agglomerating composition comprising an approximately 1% animal glue solution in water, from 5% to 20%, based on the weight of dry glue, of a reactive trivalent chromic salt, and from 3% to 12% of a water soluble soap, the pH of the solution being adjusted to within the pH range of 3.9 to 5.3.

3. An agglomerating composition comprising an approximately 1% animal glue solution in water, 10% to 20% of potassium chrome alum, and from 3% to 12% of water soluble rosin size, the percentages being based on the weight of the dry glue.

4. A composition for effecting agglomeration of suspension of solids in an aqueous medium to facilitate removal of the same from the aqueous medium, said composition comprising an animal protein dissolved in water to form an approximately 1% protein solution, and from 5% to 20% based on the weight of dry glue of a trivalent chromic salt to activate the animal protein by imparting electrical charges to the glue protein without producing any tanning action on said protein, which electrical charges are imparted to solids in an aqueous suspension when said composition is added thereto.

5. A composition for effecting agglomeration of suspension of solids in an aqueous medium to facilitate removal of the same from the aqueous medium, said composition comprising an animal protein dissolved in water to form an approximately 1% protein solution and from 5% to 20% based on the dry weight of the glue of a chromic salt which in conjunction with the glue solution will develop a purple color of the composition on aging of the same from 3 to 6 hours, said chromic material imparting electrical charges to the glue protein without producing any tanning action on said protein, which electrical charges are imparted to solids in an aqueous suspension when said composition is added thereto.

6. A composition for effecting agglomeration of suspension of solids in an aqueous medium to facilitate removal of the same from the aqueous medium, said composition comprising an animal protein dissolved in water to form an approximately 1% protein solution and from 10% to 20% of potassium chrome alum based upon the weight of the dry glue to activate the animal protein by imparting electrical charges to the glue protein without producing any tanning action on said protein, which electrical charges are imparted to solids in an aqueous suspension when said composition is added thereto.

RICHARD TUTT, Jr.
JOHN R. HUBBARD.
CHARLES R. McKEE.